J. E. GREENAWALT.
GRATES FOR SINTERING PANS.
APPLICATION FILED DEC. 6, 1913.
1,098,035.
Patented May 26, 1914.
3 SHEETS—SHEET 2.
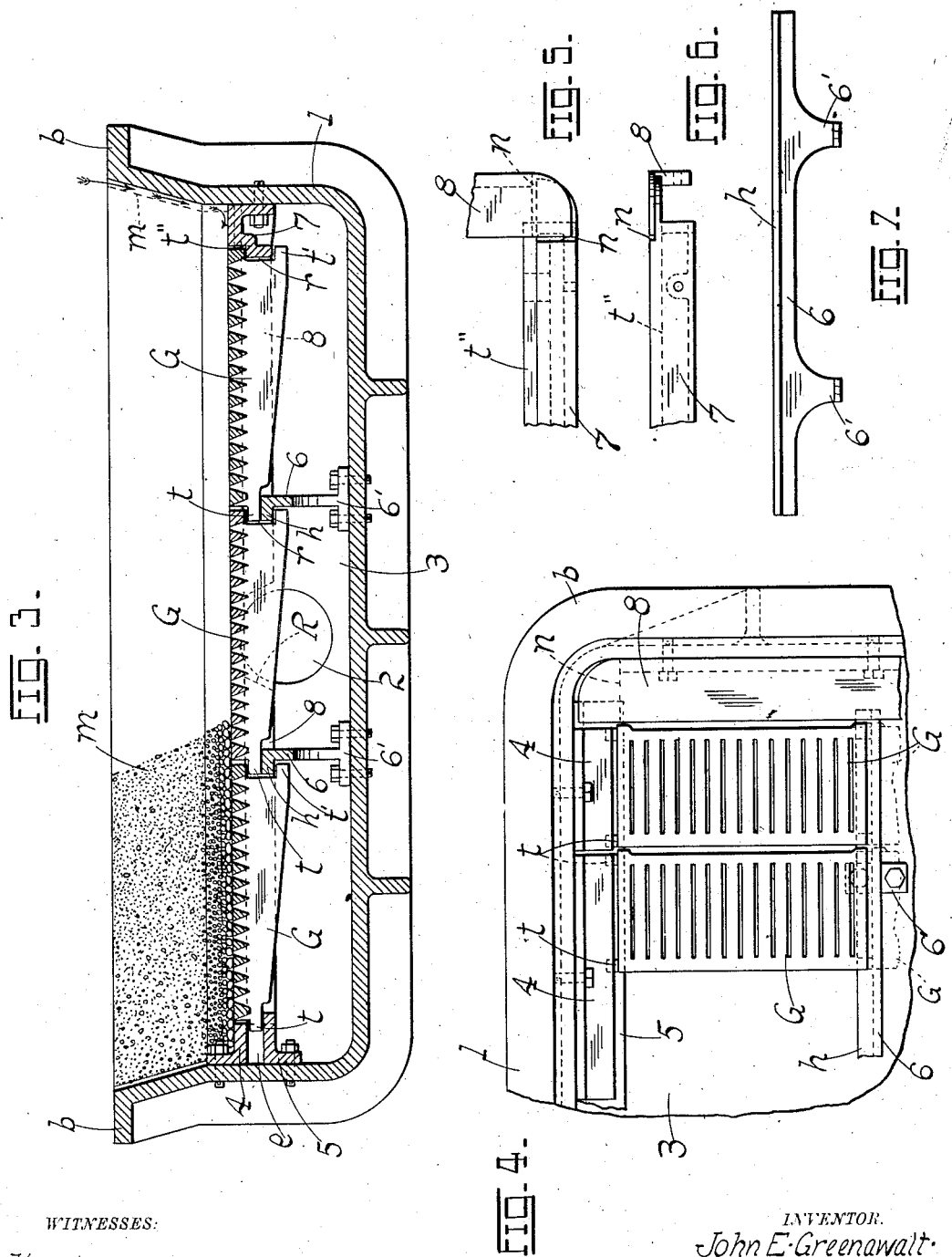
WITNESSES:
Harry A. Beiner
Jos. A. Michel
INVENTOR.
John E. Greenawalt.
BY Emil Starek
ATTORNEY.

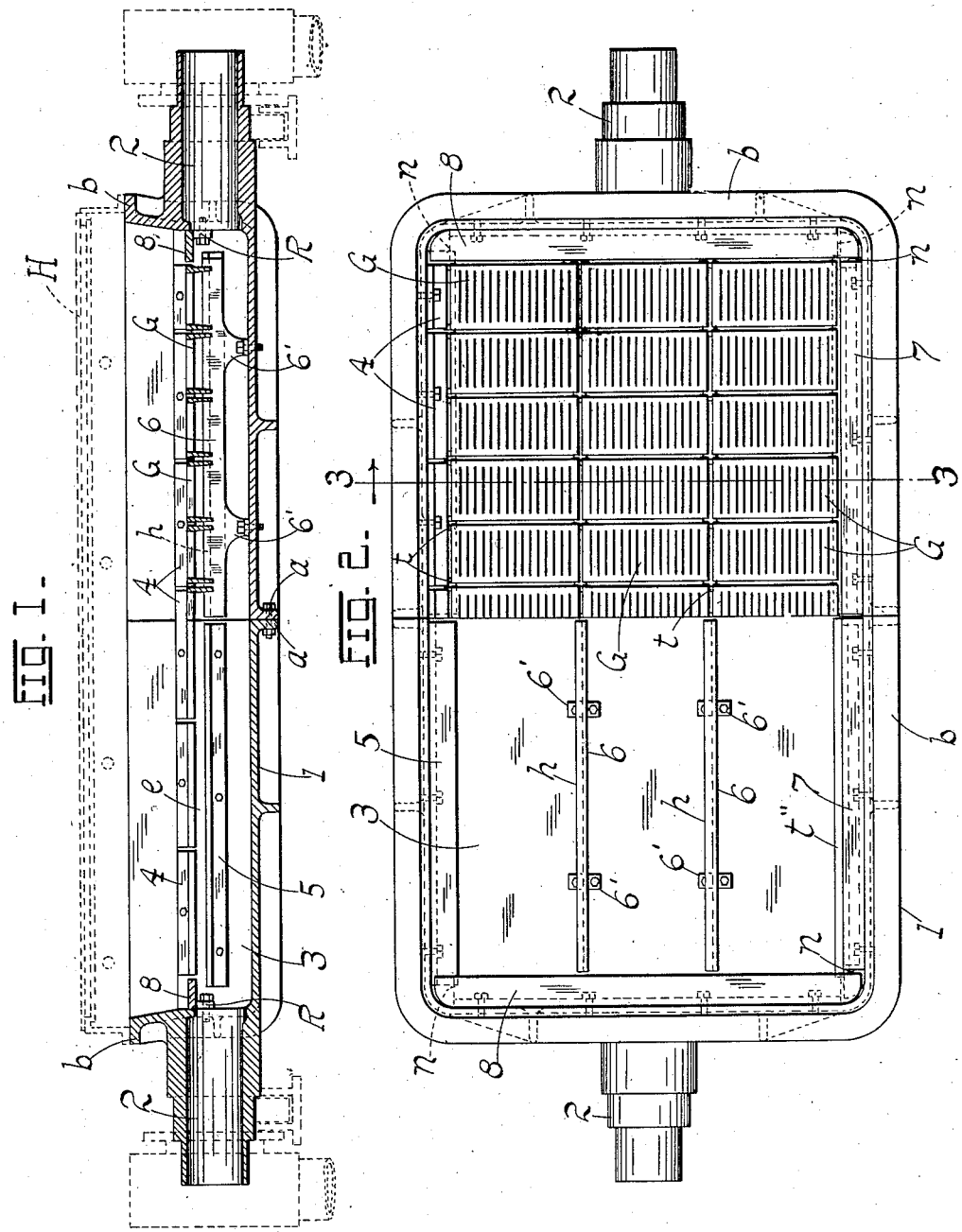

J. E. GREENAWALT.
GRATES FOR SINTERING PANS.
APPLICATION FILED DEC. 6, 1913.
1,098,035.
Patented May 26, 1914.
3 SHEETS—SHEET 3.
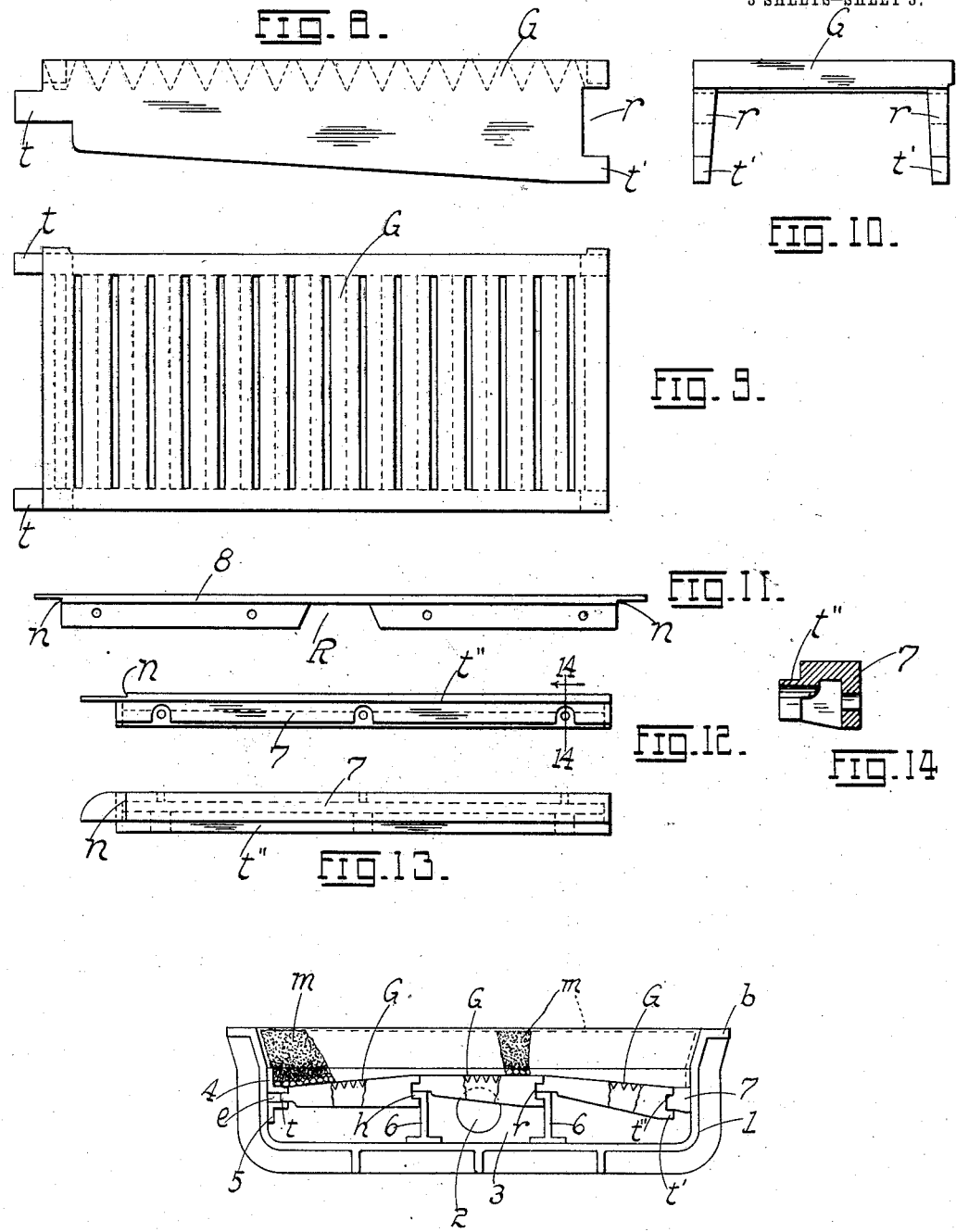

UNITED STATES PATENT OFFICE.

JOHN E. GREENAWALT, OF DENVER, COLORADO.

GRATES FOR SINTERING-PANS.

1,098,035.  Specification of Letters Patent.  Patented May 26, 1914.

Application filed December 6, 1913. Serial No. 805,055.

*To all whom it may concern:*

Be it known that I, JOHN E. GREENAWALT, a citizen of the United States, residing at Denver, in the county of Denver and State of Colorado, have invented certain new and useful Improvements in Grates for Sintering-Pans, of which the following is a full, clear, and exact description, reference being had to the accompanying drawings, forming a part hereof.

My invention has relation to improvements in grates for sintering pans; and it consists in the novel features of construction more fully set forth in the specification and pointed out in the claims.

In the drawings, Figure 1 is a middle vertical longitudinal section of a sintering pan showing my invention applied thereto, the grates being removed from one half of the pan, and the middle grate supports being removed from the opposite half; Fig. 2 is a top plan of the pan with one-half of the grates in position, the balance of the grates and the top locking angle-plates therefor being removed to expose the several grate supports; Fig. 3 is an enlarged vertical cross-section on the line 3—3 of Fig. 2; Fig. 4 is an enlarged top plan of one corner of the pan with grates in position; Fig. 5 is a plan of the overlapping ends of the side and end members forming the outer imperforate ore-supporting ledge around the grates; Fig. 6 is an elevation of Fig. 5; Fig. 7 is an elevation of one of the middle or intermediate grate supports; Fig. 8 is a side view of one of the grate-sections; Fig. 9 is a top plan of one of the grate-sections; Fig. 10 is a rear end view of a grate-section; Fig. 11 is an elevation of one of the end ledge-forming members; Fig. 12 is an elevation of one of the channels or side ledge-forming members; Fig. 13 is a top plan of Fig. 12; Fig. 14 is an enlarged cross-section on the line 14—14 of Fig. 12; and Fig. 15 is a diagrammatic view of a cross-section of a pan showing an arched or cambered disposition of the grate-sections.

The present invention is directed to improvements in grates for ore-sintering or roasting pans, said grates forming the perforated support for the charge undergoing treatment in the pan (or equivalent treatment vessel), the primary object of the invention being to subdivide a grate disposed across any given dimension of the pan (the grates are usually disposed across the width of the pan) into a series of interlocking sections, and in such a way that should it be necessary to replace any given section, it may be done with little loss of time and without material disturbance of adjacent sections. The sectional character of the grate offers the advantage over a single long grate in that when a long grate has a hole burnt into it, the entire grate must be discarded thereby entailing considerable waste of metal; besides, a long grate is difficult to cast, is not easily handled and is difficult to place into position. Small grates (that is to say, grates complete in themselves) on the other hand, are difficult to fasten into position because the securing means, such as bolts or their equivalents, will burn out from the intense heat to which they are subjected while the ore charge (or other material) is undergoing treatment. In the present embodiment of my invention, securing devices on the order of bolts or their equivalents are entirely eliminated for purposes of maintaining the grates in position, the grate sections being kept in place by interlocking with one another when once supported, as will more fully hereinafter appear.

The invention is herein illustrated as applied to an ore-sintering pan on the order of that forming the subject-matter of my pending application for sintering apparatus, filed June 24, 1912, Serial Number 705,495, but it is to be understood that I do not wish to be restricted in its application to a pan or treatment vessel of that type, it being apparent that the grate has a wide range of uses and may be applied in any relation where it subserves its legitimate function. In applying the grate however, to a type of pan such as referred to, special provision must be made on the pan not only to support the grate sections above the bottom of the pan, but to provide means for preventing the air currents from short-circuiting to the grates through the space formed between the walls of the pan and the sintered charge, by the shrinkage of the charge as a result of the propagation of the zone of combustion therethrough. Provision must likewise be made to prevent the charge from burning faster around the sides and ends of the grates than over the body of the grates, so as to maintain the desired evenness of propagation of the zone of combustion.

A further object of the invention is to provide a construction which will permit the grate sections to expand freely under the heat to which they are subjected; one which will keep the grate sections in position with a tilting or inversion of the pan when the charge is dumped.

A further object is to provide a construction susceptible of modification without departure from the spirit of the invention; and one possessing further and other advantages better apparent from a detailed description of the invention which is as follows:

Referring to the drawings, and for the present to Figs. 1 to 14 inclusive, 1 represents a pan, or receptacle which in practice may be of any convenient size, the dimensions of that here shown being about twelve feet in length, seven feet wide and two feet deep, the outer walls of the pan being suitably ribbed to impart rigidity thereto. As in my pending application aforesaid, the pan herein is provided with terminal hollow trunnions 2 about which the pan may be tilted for purposes of dumping the charge, the passage-ways of the trunnions being connected to any suitable exhauster (not shown) for drawing the air and gases through the charge deposited on the perforated support formed by the grates to be presently described. As well understood in practice, an igniting hood H is initially deposited over the pan to ignite the charge deposited on the pan, only the outline of the hood being here indicated as the same forms no part of the subject-matter of the present invention. The pan is preferably made in two sections bolted together along the transverse flanges $a$, $a$, the trunnions 2 being formed on the outer ends of the sections and opening into the chamber 3 below the grates and charge $m$ supported thereon. In practice the charge (when of maximum thickness) reaches to the upper edge of the pan, being leveled off substantially even with the flange $b$ on which the igniting hood is deposited.

Disposed longitudinally along the inner face of one of the side walls of the pan, and spaced vertically apart from one another, are a series of parallel angle-plates 4 and 5, the horizontal legs of the lower plates 5 being wider than the corresponding legs of the upper plates 4, the opposing legs forming collectively between them a substantially continuous groove $e$ for the reception of the lugs $t$ formed on each side of one end of each member of a series of grate-sections G disposed transversely of, or across the width of the pan, the opposite end of the grate-section (of any series) being provided at the sides with bottom lugs $t'$ forming recesses $r$ with the adjacent terminal of the grate-section. The lower portion of each recess $r$ receives the flange $h$ projecting laterally from the upper edge of a plate or equivalent structural member 6 raised above the bottom of the pan and bolted thereto through the feet 6', the upper portions of said recesses $r$ receiving the lugs $t$ of the next grate section of the series, said lugs $t$ resting on the upper edge of the member 6 and on the flange $h$ thereof. The recesses $r$ of the second grate-section receive the flange $h$ of a second member 6 (disposed parallel to the first member) and the lugs $t$ of the third grate section (and so on, depending on the number of grate sections). In the present embodiment of my invention there are three grate-sections disposed across the smaller dimension of the pan (that is to say across the width of the pan), the last section being supported at its outer end or that opposite its lugs $t$ by a ledge $t''$ formed on the inner leg of a channel plate or beam 7 disposed parallel to the members 4 and 5 and secured to the inner face of the opposite vertical wall of the pan, the channel leg which supplies the ledge $t''$ filling the recesses $r$ of said last mentioned grate section. In the present illustration the beam 7 is made in two halves or sections (one for each section of the pan), the plates 5 and 6 being likewise in two sections for the same reason. In assembling the parts, the member 7 is first secured in position to the pan wall, after which the recesses $r$ of a grate section are passed over the ledge $t''$ thereof, the lugs $t$ at the opposite end of the grate-section being deposited on the adjacent member 6 and flange $h$ thereof. The recesses $r$ of the next grate-section are then passed over the flange $h$ of said member 6 and over the lugs $t$ of the grate-section supported thereby, the lugs $t$ of said next or second grate section being deposited in a similar manner over the next succeeding member 6 and flange $h$ thereof. Finally (assuming there are three grate-sections) the recesses $r$ of the last grate section are passed over the flange $h$ of the second member 6 and lugs $t$ of the grate-section resting thereon, the lugs $t$ of the last grate-section being deposited on the horizontal leg of the member 5 which is already in place. Finally the angle plates 4 are bolted to the pan wall in position to hold the last grate-sections deposited on the members 5, thus completing the assembling of the parts. To remove a grate-section at any time it is only necessary to detach the particular member 4 identified with the interlocked series of which such section forms a member. This may be done quickly as obvious from the drawings, and in case of repair or in the replacing of any worn out grate-section very little time is lost; and none of the sections of adjacent grates need be disturbed. While I have shown three sections composing a grate, I do not limit myself to this number; I may use two or more sections depending on the dimensions of the pan or treatment vessel.

Bolted to the inner faces of the end vertical walls of the pan are angle bars 8 whose horizontal legs project over and beyond the adjacent ends of the members 5 and 7 respectively, and to a point in close proximity to the outer terminals of the adjacent members 4 and 6. The horizontal legs of the members 8 and 4, and the upper walls of the channels 7 have their upper surfaces disposed in substantially the same plane (coincident with the supporting surfaces of the grates), and collectively form an imperforate and practically continuous ledge around the grates for the support of the marginal portions of the charge deposited on the grates and enveloped by the vertical or inclosing walls of the pan above the grates. The terminals of the horizontal legs of the members 8 overlap the corresponding ends or extensions of the tops of the channels 7 the lapping portions being reduced in thickness to the depth of the offsets $n$ (Figs. 5, 6) to bring the surfaces of the overlapping portions of the members 8 flush with the upper surface of the member 7. Necessarily the vertical legs of the members 8 are provided with cutaway portions R (Fig. 11) opposite the hollow trunnions 2 for the free passage of the gases from the chamber 3 through said trunnions, the members 6 necessarily terminating short of the end walls of the pan to permit the gases to have free circulation and egress from the spaces between each of said members and the side walls of said chamber.

In a charge of the magnitude contemplated by the present pan, it is extremely desirable that the zone of combustion shall propagate itself evenly through the charge so that all parts may be roasted or sintered at one and the same time. A charge undergoing treatment shrinks more or less, the shrinkage being away from the inclosing walls of the pan. This leaves open spaces (between the pan walls and the sides and ends of the charge) through which the air percolating through the charge, would under the old practice become shunted or short-circuited, the shunted air passing freely through these open spaces and through the openings of the grates into the vacuum chamber 3. The undue rush of air at these points would likewise increase the rate of combustion at the edges of the charge, causing the marginal portions of the charge to sinter in advance of the main body of the charge. This was a decided objection because the outer sintered portions being relatively more porous than the inner unsintered portions would permit the air to leak through into the chamber 3, and this leakage coupled with the leakage of the shunted currents not only entailed much loss of power, but lengthened the time required to sinter the charge. It may be stated in passing that the charge naturally tends to burn faster at the edges (sides and ends) than in the interior owing to the chilling effects of the comparatively cool walls of the pan, this being specially the case with charges containing a high per cent. of fuel content (carbon or sulfur); and when this fast burning is still further enhanced by the shrinkage of the charge above alluded to, it is apparent that this becomes a decided objection in the operation of sintering charges *en masse*. With my present improvement, in which the outer portions of the charge are supported by the imperforate ledge (or ledges) formed by the members 4, 7, 8 (or their equivalents), the shrinkage of the charge does not interfere with the even propagation of the zone of combustion, because the air drawn through the charge at the edges thereof must first pass around this ledge (see arrows Fig. 3). The air passing down along the walls of the pan must pass horizontally the width of the ledge before it can get to the grates and find its way to the chamber 3 communicating with the exhauster or suction apparatus. Of course, the ledge can not be made absolutely air tight as some clearance must be left between the structural pieces forming the ledge (the term "ledge" herein designating the several ledges formed by the members 4, 7, 8, and which practically make a single ledge), to allow for expansion; but the ledge is practically air tight. The presence of the imperforate ledge (or ledges) therefore prevents the evil effects of the air currents short circuiting between the pan walls and the outer vertical surfaces of the charge (shrinking away from said walls), arresting as it does, the leakage above alluded to, because the air can not pass through the ledge, but must first be deflected by and along the ledge before it can reach the openings in the grate. This results in the retardation of the currents at the outer margins of the charge; and thus the even propagation of the zone of combustion throughout the charge is assured. How the imperforate ledge is formed is immaterial. In the present illustration it is made up of the horizontal legs of the plates 4, the horizontal legs of the angle-bars 8, and the tops of the channels 7; but I do not wish to restrict myself to the particular means here selected and any and all equivalent means are contemplated by my invention. Neither do I wish to restrict myself to the specific means here shown for supporting the grate-sections, as these may be departed from without falling outside the spirit of my invention.

While each section G is a grate complete in itself, for convenience however, the term "grate" will be here employed to designate a single long grate (running cross-wise the pan) composed of a series of sections respectively interlocked and secured to the walls of the pan. Thus the intire grate area of the pan is composed of a series of juxtaposed grates, each grate comprising a series of sections disposed across one of the areal dimensions (the width in the present case) of the pan, the section of one grate having no connection with the corresponding section of a contiguous grate. It would of course, be no departure from my invention to have the grates disposed longitudinally or diagonally of the pan, or to have a pan shaped differently from that shown herein. The grate sections being interlocked and positively secured to the pan walls, the pan may be safely tilted for dumping the charge without in any wise disturbing the grates.

It has been pointed out above that the rate of combustion is ordinarily more rapid along the outer or marginal portions of the charge than at the interior, and specific means for rectifying the evil effects of such uneven combustion have been described. Where the depth or thickness of the charge deposited on the grates is uniform throughout, the evenness of propagation of the combustion zone is of course imperative; but I may so dispose the grate sections as to raise the center section slightly above the others, those on either side thereof sloping toward the pan walls. This modification is shown more or less conventionally in Fig. 15. It will be seen that when the charge is leveled off, it will be deeper at the sides than in the middle. The extra depth at the sides may then allow the zone of combustion to propagate itself faster through the charge at said sides, and yet reach the grate surfaces of the terminal grate sections at the same time that the combustion zone in the interior portions reaches the grate surface of the middle section. It follows therefore that the disposition of the grate sections as indicated in said modification, so as to arch or camber the grate across the pan (instead of disposing the grate sections in the same plane as in the main form described) has decided advantages. The arched or cambered grate is in fact eminently desirable in treating charges very high in fuel content such as carbon or sulfur. The use of the arched grate for such charges would insure the sintering of the mass throughout, at one and the same time, even though the rate of combustion was faster at the sides than at the center.

The reason the arched grate is desirable for charges high in fuel content is that the combustion in such charges is difficult to control, the control of combustion in charges having normal fuel content being comparatively easy. The latter charges may be treated on a level grate or one on the order of the form first described, when combined with an imperforate ledge to support the outer portions of the charge. When the cambered grate is employed the imperforate ledges at the outer edges of the charge-supporting surface are not necessarily indispensable.

Having described my invention, what I claim is:—

1. In combination with a treatment vessel provided with a charge support comprising an inner perforated portion and an outer bounding imperforate portion, a vacuum chamber below and contiguous to, said support, the perforated portion comprising a series of interlocked sections disposed across one of the areal dimensions of the vessel, means for locking the outer ends of the sections terminating the series to the adjacent imperforate portions of the support, suitable members traversing the vacuum chamber for supporting the perforated sections at their interlocked portions, and walls for inclosing the charge extending above the support to a height corresponding to the maximum thickness of charge available for treatment.

2. In combination with a treatment vessel provided with a charge-support comprising an inner main perforated portion and an outer bounding imperforate portion, a vacuum chamber below and contiguous to, said support, the perforated portion comprising a series of interlocked sections disposed across one of the areal dimensions of the vessel, means for locking the outer ends of the sections terminating the series to the adjacent imperforate portions of the support, suitable members supporting the perforated sections at their interlocked portions, said supporting members traversing the vacuum chamber in a direction across the perforated sections, and operating to allow for free circulation of the gases through the vacuum chamber, and walls inclosing the charge extending above the support to the upper surface of the charge to be treated.

3. In combination with a treatment vessel having inclosing walls for the charge, and a vacuum chamber below and contiguous to, the plane of the bottom of said inclosing walls, imperforate charge-supporting ledges disposed adjacent the said plane, secured to the walls of the vessel, a plurality of grate sections spanning the space inclosed by said ledges, the said sections being disposed across one of the areal dimensions of the vessel, and having their outer terminals locked to adjacent portions of the ledges, means for locking the grate sections to one another at points adjacent the plane separating the vacuum chamber from the charge-inclosing walls, and members disposed in the vacuum chamber for supporting the grate sections at their interlocked portions.

In testimony whereof I affix my signature, in presence of two witnesses.

JOHN E. GREENAWALT.

Witnesses:
 AUGUSTA DUE,
 MARY C. DINNEEN.